(12) United States Patent
Yamagishi et al.

(10) Patent No.: US 8,355,342 B2
(45) Date of Patent: Jan. 15, 2013

(54) VIDEO QUALITY ESTIMATION APPARATUS, METHOD, AND PROGRAM

(75) Inventors: Kazuhisa Yamagishi, Tokyo (JP); Takanori Hayashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 292 days.

(21) Appl. No.: 12/811,369

(22) PCT Filed: Dec. 15, 2008

(86) PCT No.: PCT/JP2008/072760
§ 371 (c)(1),
(2), (4) Date: Jun. 30, 2010

(87) PCT Pub. No.: WO2009/087863
PCT Pub. Date: Jul. 16, 2009

(65) Prior Publication Data
US 2010/0284295 A1    Nov. 11, 2010

(30) Foreign Application Priority Data
Jan. 8, 2008 (JP) .................................. 2008-001059
Apr. 8, 2008 (JP) .................................. 2008-100820

(51) Int. Cl.
*H04L 12/26* (2006.01)
(52) U.S. Cl. ........... 370/253; 370/252; 375/225; 702/81
(58) Field of Classification Search .................. None
See application file for complete search history.

(56) References Cited

U.S. PATENT DOCUMENTS

| | | | | |
|---|---|---|---|---|
| 8,094,713 | B2 * | 1/2012 | Clark | 375/240.01 |
| 8,154,602 | B2 * | 4/2012 | Yamagishi et al. | 348/192 |
| 2007/0053303 | A1 | 3/2007 | Kryuchkov | |
| 2008/0062322 | A1 * | 3/2008 | Dey et al. | 348/589 |
| 2008/0089414 | A1 * | 4/2008 | Wang et al. | 375/240.13 |
| 2008/0144519 | A1 * | 6/2008 | Cooppan | 370/252 |
| 2009/0040311 | A1 * | 2/2009 | Okamoto et al. | 348/181 |

FOREIGN PATENT DOCUMENTS

| | | |
|---|---|---|
| JP | 2007-329773 A | 12/2007 |
| JP | 2007-329774 A | 12/2007 |
| JP | 2008-301027 A | 12/2008 |
| WO | WO 2007/129423 A1 | 11/2007 |

* cited by examiner

*Primary Examiner* — Donald Mills
(74) *Attorney, Agent, or Firm* — Blakely, Sokoloff, Taylor & Zafman

(57) ABSTRACT

A packet loss frequency calculation unit (102) which counts, from an extracted packet loss pattern, packet losses generated in a predetermined interval representing the interval of a plurality of continuous IP packets as a packet loss of one time, thereby calculating the value as a packet loss frequency. The packet loss frequency calculation unit (102) also calculates a burst packet loss length representing the number of continuously lost packets from the packet loss pattern. An average burst packet loss length within a quality estimation interval is calculated from the burst packet loss length. A packet loss variation index calculation unit (106) derives a packet loss variation index from the average burst packet loss length. On the other hand, an encoding quality calculation unit (103) calculates an encoded video quality value based on the extracted encoding bit rate and frame rate. A video quality estimation unit (104) calculates a video quality value based on the encoded video quality value, packet loss frequency, and packet loss variation index. This allows to properly estimate the quality of a video in which a burst packet loss has occurred.

17 Claims, 8 Drawing Sheets

FIG.5A

IPTV, HD, H, 264 — 103A

| BIT RATE (Mbps) | FRAME RATE (fps) | VIDEO QUALITY VALUE IMMEDIATELY AFTER ENCODING |
|---|---|---|
| 20 | 30 | 4.8 |
| 18 | 30 | 4.6 |
| 16 | 30 | 4.5 |
| ⋮ | ⋮ | ⋮ |
| 2 | 30 | 1.5 |

| SERVICE TYPE | VIDEO FORMAT | CODEC | v1 | v2 | v3 | v4 | v5 | v6 | v7 |
|---|---|---|---|---|---|---|---|---|---|
| IPTV | HD | H.264 | 1.4 | 0.023 | 3.8 | 184 | 1.2 | 1.4 | 0.00039 |
| IPTV | SD | H.264 | 1.1 | 0.010 | 3.9 | 100 | 2.3 | 1.6 | 0.00052 |
| --- | --- | --- | --- | --- | --- | --- | --- | --- | --- |
| VoD | HD | MPEG2 | --- | --- | --- | --- | --- | --- | --- |
| VoD | HD | MPEG4 | --- | --- | --- | --- | --- | --- | --- |
| --- | --- | --- | --- | --- | --- | --- | --- | --- | --- |
| VIDEOPHONE | HD | H.264 | --- | --- | --- | --- | --- | --- | --- |
| --- | --- | --- | --- | --- | --- | --- | --- | --- | --- |

| SERVICE TYPE | VIDEO FORMAT | CODEC | FRAME RATE | v3 | v4 | v5 |
|---|---|---|---|---|---|---|
| IPTV | HD | H.264 | 30 | 1.5 | 1.9 | 3.2 |
| IPTV | SD | H.264 | 30 | 5.2 | 4.3 | 2.1 |
| --- | --- | --- | --- | --- | --- | --- |
| VoD | HD | MPEG2 | 30 | 2.3 | 5.1 | 3.1 |
| VoD | SD | MPEG2 | 30 | 2.9 | 7.5 | 6.2 |
| --- | --- | --- | --- | --- | --- | --- |
| VIDEOPHONE | QCIF | H.261 | 15 | 5.1 | 1.3 | 4.2 |
| --- | --- | --- | --- | --- | --- | --- |

FIG.6A

IPTV, HD, H, 264 — 104A

| VIDEO QUALITY VALUE IMMEDIATELY AFTER ENCODING | PACKET LOSS FREQUENCY | VIDEO QUALITY VALUE IMMEDIATELY AFTER ENCODING |
|---|---|---|
| 4.8 | 0 | 4.8 |
| 4.6 | 1 | 4.0 |
| 4.5 | 2 | 2.5 |
| ⋮ | ⋮ | ⋮ |
| 1.5 | 10 | 1.0 |

| SERVICE TYPE | VIDEO FORMAT | CODEC | v8 |
|---|---|---|---|
| IPTV | HD | H.264 | 2.1 |
| IPTV | SD | H.264 | 3.5 |
| --- | --- | --- | --- |
| VoD | HD | MPEG2 | --- |
| VoD | HD | MPEG4 | --- |
| --- | --- | --- | --- |
| VIDEOPHONE | HD | H.264 | --- |
| --- | --- | --- | --- |

| SERVICE TYPE | VIDEO FORMAT | CODEC | a | b | c |
|---|---|---|---|---|---|
| IPTV | HD | H.264 | 1.5 | 1.9 | 3.2 |
| IPTV | SD | H.264 | 5.2 | 4.3 | 2.1 |
| ⋮ | ⋮ | ⋮ | ⋮ | ⋮ | ⋮ |
| VoD | HD | MPEG2 | 2.3 | 5.1 | 3.1 |
| VoD | SD | MPEG2 | 2.9 | 7.5 | 6.2 |
| ⋮ | ⋮ | ⋮ | ⋮ | ⋮ | ⋮ |
| VIDEOPHONE | QCIF | H.261 | 5.1 | 1.3 | 4.2 |

INTERVAL Ti

VIDEO QUALITY ESTIMATION APPARATUS, METHOD, AND PROGRAM

This is a non-provisional application claiming the benefit of International application number PCT/JP2008/072760 filed Dec. 15, 2008.

TECHNICAL FIELD

The present invention relates to a video quality estimation technique of estimating the quality of video communication in an IPTV service, video distribution service, video communication service, or the like provided via an IP (Internet Protocol) network such as the Internet.

BACKGROUND ART

As the Internet access lines are growing in speed and band, a video communication service is expected to be more popular, which transfers video media including videos and speeches between terminals or between server terminals via the Internet.

The Internet is a network whose communication quality is not necessarily guaranteed. For this reason, when performing communication using speech and video media, if network bandwidth is narrow or network is congested between user terminals, the quality of the speech and video media perceived by users [QoE: (Quality of Experience)] degrades.

More specifically, quality degradation in a video is perceived as a blur, smear, mosaic-shaped distortion, and jerky effect in the video. To provide a high-quality video communication service, application or network quality design before providing the service and quality management after the start of the service are important. Hence, a simple and efficient video quality assessment technique capable of appropriately expressing video quality perceived by a viewer is necessary.

Conventionally, ITU-T (International Telecommunication Union-Telecommunication Standardization Sector) recommendation J.144 (ITU-T Recommendation J.144) defines an objective video quality assessment method. ITU-T recommendation G.1070 (ITU-T Recommendation G.1070) defines a quality estimation method to be used for quality design of a videophone. These objective assessment techniques can estimate subjective quality with the estimation error that is equivalent to the statistical uncertainty of the subjective quality under predetermined conditions.

DISCLOSURE OF INVENTION

Problems to be Solved by the Invention

However, ITU-T Recommendation J.144 described above is a quality estimation method using a video media signal (pixel signal), and requires an enormous calculation amount concerning quality estimation. For this reason, the method is not suitable for estimating quality by extracting quality information between networks and, more particularly, for quality estimation in a large-scale network.

The method of estimating quality based on quality parameters that influence video quality (ITU-T Recommendation G.1070 described above) is a model capable of estimating only a random packet loss (that is, a packet loss whose burst loss length is "1") but not a burst packet loss (continuously generated packet losses).

More specifically, when a burst packet loss is generated, a plurality of IP packets are lost continuously at one time. Hence, the frequency of losses in a video is lower than that of random packet losses. For example, assume that the packet loss rate is 3%, and the packet loss frequency is 3 when the burst packet loss length is "1". In this case, when the burst packet loss length is "3", the packet loss frequency is 1.

That is, in the former case (packet losses when the packet loss length is "1", i.e., random packet losses), a user perceives that packet losses have occurred three times in the video. In the latter case (continuously generated packet losses, i.e., burst packet losses), the user perceives that a packet loss has occurred once.

As described above, if the packet loss rate is the same, video quality when burst packet losses are generated is higher than that when random packet losses are generated, as shown in FIG. 11A. Note that in FIG. 11A, ABL represents the average burst packet loss length. The ABL is obtained by dividing the number of lost packets by the packet loss frequency. Since the conventional method cannot take the above-described features into consideration, video quality when burst packet losses are generated is assessed to be lower than the actual quality, resulting in very low estimation accuracy.

In mobile communication, one frame is formed from one or several packets. When a long burst packet loss is generated, several frames are lost (in a video of HD standard, one frame includes several ten packets or more, and therefore, if the burst packet loss length is up to 10, only one frame degrades). On the other hand, random packet losses (that is, when the burst packet loss length is 1) rarely occur across several frames) (however, if one packet contains information of a plurality of frames, the plurality of frames are lost in the loss of one packet). Hence, if the burst packet loss length is long, a plurality of frames degrade. Quality perceived by a human becomes poorer as compared to random packet losses. More specifically, for example, when the frame rate is 30 fps, the lost time of one frame is 33 ms. For example, if 10 frames are lost, the loss continues for 330 ms. At the same packet loss frequency, quality is poorer for burst packet losses than that for random packet losses.

The present invention has been made in consideration of the above-described problems, and has as its object to allow to reliably estimate the quality of a video in which burst packet losses are generated.

Means of Solution to the Problems

In order to solve the above-described problems, according to the present invention, there is provided a video quality estimation apparatus comprising a packet analysis unit which extracts an encoding bit rate, a frame rate, and a packet loss pattern from an input IP packet as quality parameters, a packet loss frequency calculation unit which counts, from the extracted packet loss pattern, packet losses generated in a predetermined interval representing an interval of a plurality of continuous IP packets as a packet loss of one time, thereby calculating the count value as a packet loss frequency, an encoding quality calculation unit which calculates a first video quality value based on the extracted encoding bit rate and frame rate, and a video quality estimation unit which calculates a second video quality value based on the packet loss frequency calculated by the packet loss frequency calculation unit and the first video quality value calculated by the encoding quality calculation unit.

According to the present invention, there is also provided a video quality estimation method comprising the extraction step of extracting an encoding bit rate, a frame rate, and a packet loss pattern from an input IP packet as quality parameters, the packet loss frequency calculation step of counting, from the extracted packet loss pattern, packet losses generated in a predetermined interval representing an interval of a plurality of continuous IP packets as a packet loss of one time, thereby calculating the count value as a packet loss frequency, the encoding quality calculation step of calculating a first video quality value based on the extracted encoding bit rate and frame rate, and the video quality estimation step of calculating a second video quality value based on the calculated packet loss frequency and first video quality value.

Effects of the Invention

According to the present invention, packet losses generated in a predetermined interval representing the interval of a plurality of continuous IP packets are counted from an extracted packet loss pattern as a packet loss of one time, thereby calculating the count value as a packet loss frequency. On the other hand, a first video quality value is calculated based on the extracted encoding bit rate and frame rate. A second video quality value is calculated based on the first video quality value and the packet loss frequency as a video quality value. This allows to properly estimate the quality of a video in which a burst packet loss has occurred.

In addition, according to the present invention, a burst packet loss length representing the number of continuously lost packets is calculated from the extracted packet loss pattern. The second video quality value is calculated based on the calculated burst packet loss length and packet loss frequency and the calculated first video quality value. This allows to properly estimate video quality in a low bit rate communication such as mobile communication. It is therefore possible to avoid the problem that the accuracy of estimating the quality of a video in which a burst packet loss has occurred considerably lowers.

BRIEF DESCRIPTION OF DRAWINGS

FIG. 5A is a table showing the arrangement of a quality database 103A provided in the video quality estimation apparatus;

FIG. 5B is a table showing the arrangement of a coefficient database 103B provided in the video quality estimation apparatus;

FIG. 5C is a table showing the arrangement of a coefficient database 103C provided in the video quality estimation apparatus;

FIG. 6A is a table showing the arrangement of a quality database 104A provided in the video quality estimation apparatus;

FIG. 6B is a table showing the arrangement of a coefficient database 104B provided in the video quality estimation apparatus;

FIG. 7 is a table showing the arrangement of a coefficient database 105B;

BEST MODE FOR CARRYING OUT THE INVENTION

Figure 11A:
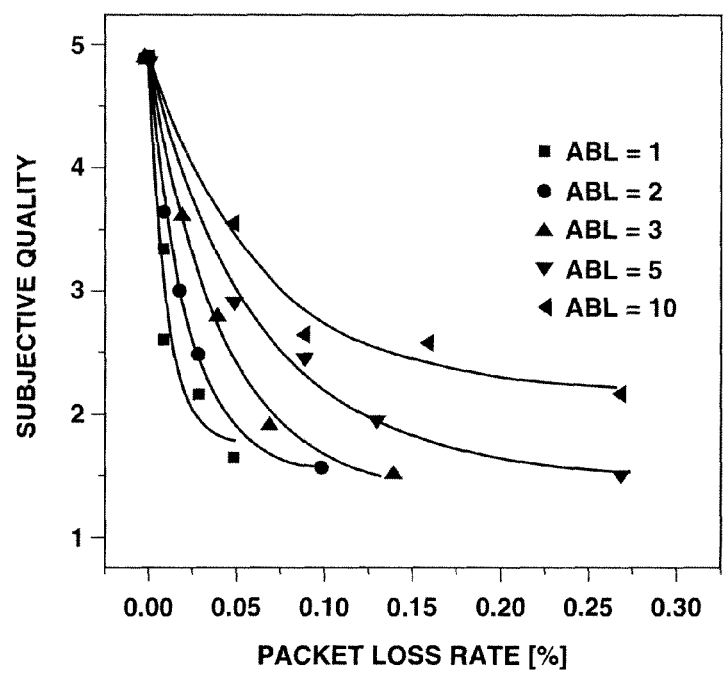
FIG. 11A is a graph showing the relationship between the subjective quality of packets and the packet loss rate according to the continuous loss length of packets.
Figure 11B:
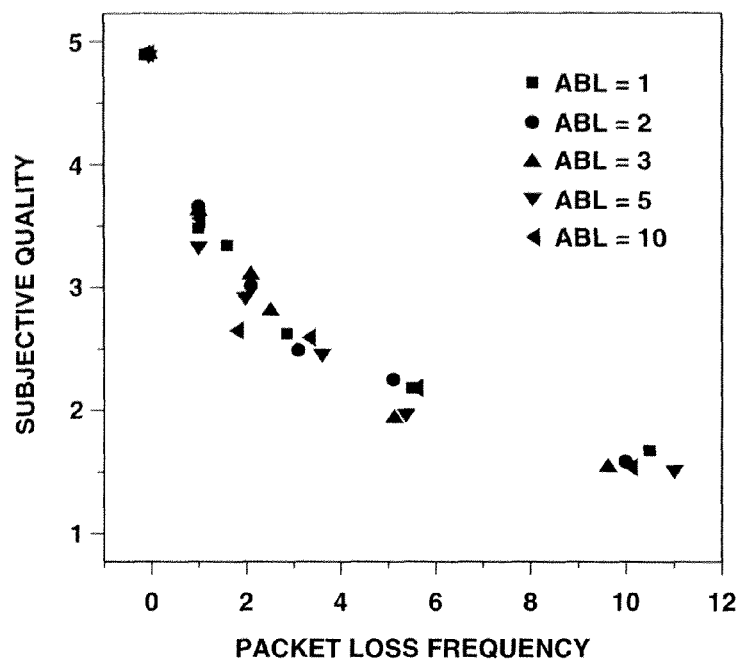
FIG. 11B is a graph showing the relationship between the subjective quality of packets and the packet loss frequency according to the continuous loss length of packets.

Generally, when the packet loss frequency is the same in high bit rate communication, quality is preferably estimated based on the packet loss frequency because the subjective quality value is almost constant independently of the continuous loss length (burst packet loss length), as is apparent from FIG. 11B. In the present invention, using this feature, quality estimation is implemented in consideration of the influence of burst packet losses. For low bit rate communication, quality estimation is implemented in consideration of the burst packet loss length.

More specifically, the method uses not the packet loss rate, unlike the prior art, but the packet loss frequency in a quality estimation interval (for example, 10 sec). That is, an IP packet is captured. It is determined based on a sequence number set in the IP packet header or RTP (Real-time Transport Protocol) header of the IP packet whether the loss is a random packet loss or a burst packet loss. The number of times of packet loss cluster generation within the quality estimation interval is counted, and the video quality (for example, MOS=2.5, where MOS is the Mean Opinion Score (subjective video quality value)) is estimated from the packet loss frequency (for example, five times).

According to the present invention, since video quality can be estimated during service providing based on information set in an IP packet extractable from a network without using the pixel information of the video media, it is possible to consider a burst packet loss by calculation in a smaller amount.

The present invention will be described in detail. As will be described later, the present invention includes a packet analysis unit 101 which extracts an encoding bit rate, frame rate, and packet loss pattern from an input IP packet as quality parameters, a packet loss frequency calculation unit 102 which counts, as a packet loss of one time, packet losses generated in a predetermined interval representing the interval of a plurality of continuous IP packets from the extracted packet loss pattern, thereby calculating the count value as a packet loss frequency, an encoding quality calculation unit 103 which calculates a first video quality value based on the extracted encoding bit rate and frame rate, and a video quality estimation unit 104 which calculates a second video quality value based on the packet loss frequency calculated by the packet loss frequency calculation unit 102 and the first video quality value calculated by the encoding quality calculation unit 103.

In this case, the packet loss frequency calculation unit 102 calculates a burst packet loss length representing the number of continuously lost packets from the extracted packet loss pattern. The video quality estimation unit 104 calculates the second video quality value based on the burst packet loss length and the packet loss frequency calculated by the packet loss frequency calculation unit 102 and the first video quality value calculated by the encoding quality calculation unit 103.

In addition, the present invention includes the extraction step of extracting an encoding bit rate, frame rate, and packet loss pattern from an input IP packet as quality parameters, the packet loss frequency calculation step of counting, as a packet loss of one time, packet losses generated in a predetermined interval representing the interval of a plurality of continuous IP packets from the extracted packet loss pattern, thereby calculating the count value as a packet loss frequency, the encoding quality calculation step of calculating a first video quality value based on the extracted encoding bit rate and frame rate, and the video quality estimation step of calculating a second video quality value based on the calculated packet loss frequency and first video quality value.

In this case, in the packet loss frequency calculation step, a burst packet loss length representing the number of continuously lost packets is calculated from the extracted packet loss pattern. In the video quality estimation step, the second video quality value is calculated based on the burst packet loss length and the packet loss frequency calculated in the packet loss frequency calculation step and the first video quality value calculated in the encoding quality calculation step.

Figure 12:
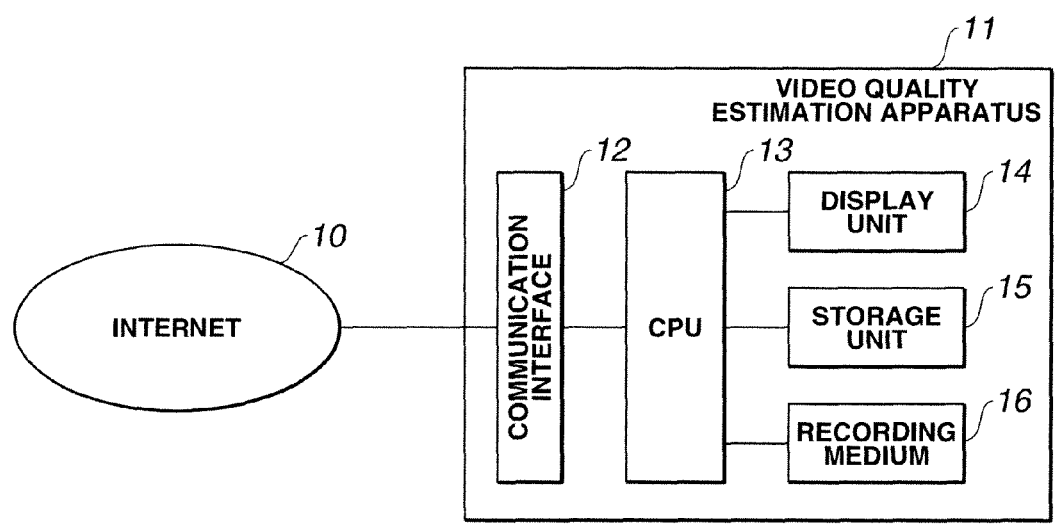
FIG. 12 is a block diagram showing the hardware configuration of the video quality estimation apparatus.

Furthermore, the present invention includes a program which causes a computer (CPU 13 shown in FIG. 12) to execute extraction processing of extracting an encoding bit rate, frame rate, and packet loss pattern from an input IP packet as quality parameters, packet loss frequency calculation processing of counting, as a packet loss of one time, packet losses generated in a predetermined interval representing the interval of a plurality of continuous IP packets from the extracted packet loss pattern, thereby calculating the count value as a packet loss frequency, encoding quality calculation processing of calculating a first video quality value based on the extracted encoding bit rate and frame rate, and video quality estimation processing of calculating a second video quality value based on the calculated packet loss frequency and first video quality value. The present invention also includes a recording medium (recording medium 16 shown in FIG. 12) that stores the program.

In this case, the packet loss frequency calculation processing includes burst packet loss length calculation processing of calculating a burst packet loss length representing the number of continuously lost packets from the extracted packet loss pattern. The video quality estimation processing includes second video quality value calculation processing of calculating the second video quality value based on the burst packet loss length and the packet loss frequency calculated in the packet loss frequency calculation processing and the first video quality value calculated in the encoding quality calculation processing. The present invention includes a program which causes the computer (CPU 13) to execute the burst packet loss length calculation processing and the second video quality value calculation processing. The present invention also includes a recording medium (recording medium 16) that stores the program.

Figure 1:
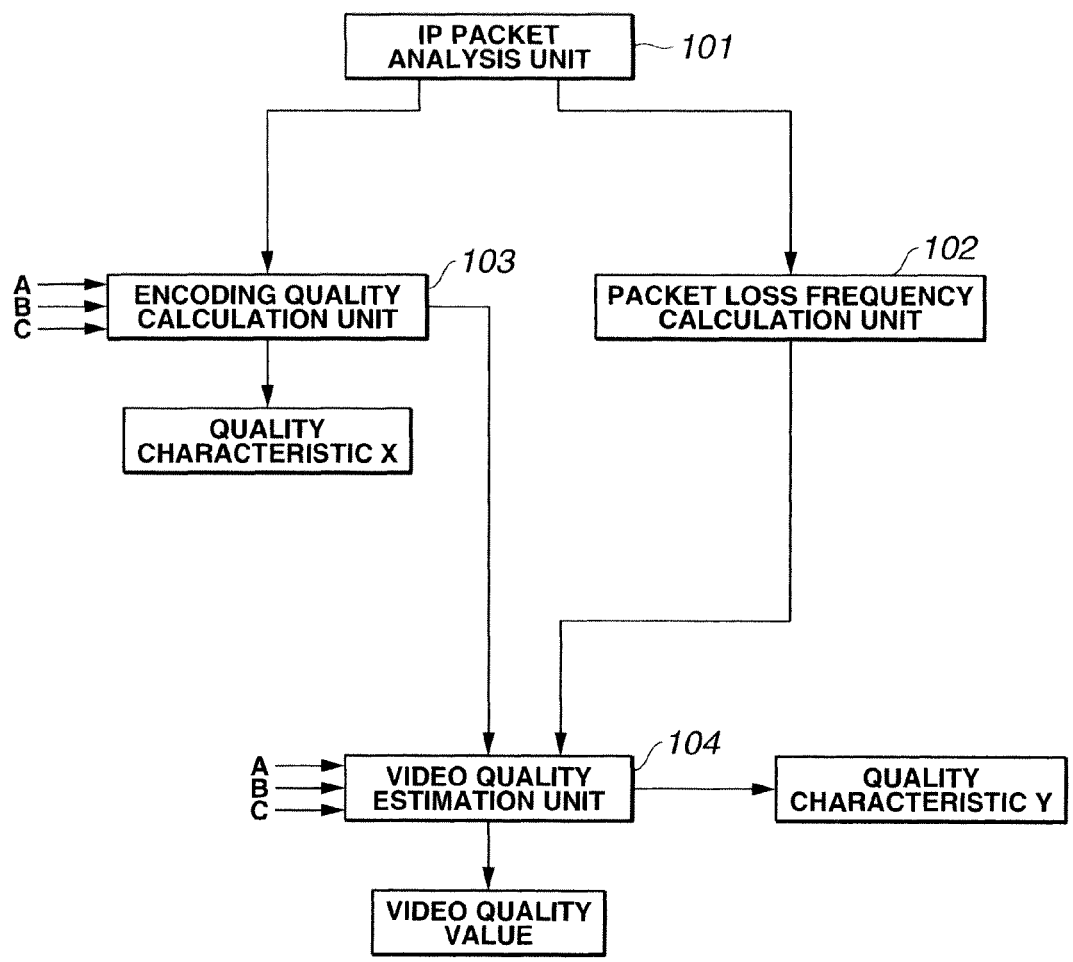
FIG. 1 is a block diagram showing a video quality estimation apparatus according to the first to fourth embodiments of the present invention.

The present invention will be described below with reference to the accompanying drawings. FIG. 1 is a block diagram showing a video quality estimation apparatus according to an embodiment of the present invention.

The video quality estimation apparatus implements the functions of units such as the IP packet analysis unit 101, packet loss frequency calculation unit 102, encoding quality calculation unit 103, and video quality estimation unit 104 shown in FIG. 1 by causing a computer such as a CPU to read out a program stored in a storage medium and execute the program. The video quality estimation apparatus also includes a storage unit which holds quality databases 103A and 104A and coefficient databases 103B and 104B to be described later.

In this video quality estimation apparatus, first, an IP packet used for video communication is captured. An IP header, transport stream (TS), elementary stream (ES), and the like exist in the IP packet.

The captured IP packet is sent to the IP packet analysis unit 101. Upon receiving the IP packet, the IP packet analysis unit 101 extracts quality parameters to be input to the packet loss frequency calculation unit 102 and the encoding quality calculation unit 103 as parameters for a video quality estimation function to be described later to estimate video quality. The extracted quality parameters are sent to the packet loss frequency calculation unit 102 and the encoding quality calculation unit 103 so that the packet loss frequency calculation unit 102 and the encoding quality calculation unit 103 receive them as the parameters for the video quality estimation function. In this embodiment, the packet loss frequency, packet loss interval, bit rate, and frame rate in a video quality estimation interval are used as the quality parameters, as will be described later.

As for the packet loss frequency, a characteristic representing that the video quality lowers as the packet loss frequency increases is used.

Not only the quality parameters used in this embodiment but also a video format, encoding rate, frame information (intra-refresh rate, GoP, and frame type), information (e.g., the number of quantization steps and transformation coefficients (DCT coefficients/integral transformation coefficients/wavelet coefficients)) for an error signal after motion compensation, packet loss information (e.g., packet loss rate, packet loss pattern, and packet delay time), and the like set in an IP packet may be used.

A detailed method of extracting the quality parameters and sending them to the packet loss frequency calculation unit 102 and the encoding quality calculation unit 103 in this embodiment will be described below.

(a) Packet Loss Pattern

To calculate the packet loss frequency, sequence number dropouts are detected from sequence numbers or the like set in IP packet headers or RTP headers. The detected numbers are sent and input to the packet loss frequency calculation unit 102.

(b) Bit Rate

A code amount (i.e., the number of bits) necessary for video encoding in an IP packet is counted. The bit rate is sent and input to the encoding quality calculation unit 103. If the bit rate cannot directly be counted because encryption or the like, referable headers are counted. The count value is subtracted from the IP length described in the IP header and used as a bit rate.

(c) Frame Rate

By referring to information concerning video encoding, a frame rate is obtained from the GoP (Group of Pictures) structure. The frame rate is sent and input to the encoding quality calculation unit 103. In a broadcast service or the like, the frame rate is often fixed. Hence, a fixed value such as 30 fps may be given to the frame rate. If the information concerning video encoding has been encrypted, a marker bit that exists in an RTP header represents the end of a frame in some applications. The number of frames may be counted using this information. Similarly, the number of frames may be counted using a payload unit start indicator in a TS header.

The packet loss frequency calculation unit 102 calculates the packet loss frequency from the packet loss pattern, and then sends and inputs it to the video quality estimation unit 104. More specifically, the packet loss frequency is calculated in accordance with the following procedure. Note that the packet loss frequency means that both one lost packet and, for example, continuously lost packets are counted as a packet loss of one time.

Figure 8A:
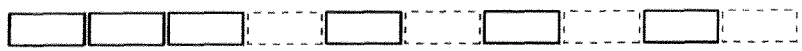
FIG. 8A is a view showing a packet loss state.
Figure 8B:
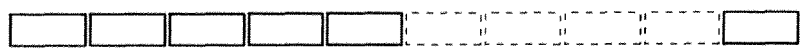
FIG. 8B is a view showing a packet loss state.
Figure 8C:
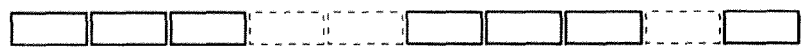
FIG. 8C is a view showing a packet loss state.

(a) For example, assume that the IP packet analysis unit 101 analyzes that IP packet sequence numbers 31 to 34 drop out so that the packets are continuously lost, as in FIG. 8B. In this case, the packet loss frequency is counted as "1" regardless of the continuous packet loss length (for example, the continuous packet loss length is "4" in the above-described example). However, if, for example, IP packet sequence numbers 31, 33, 35, and 37 drop out, as in FIG. 8A, the loss frequency is "4". If after two IP packets are continuously lost, the sequence returns to the normal condition, and then one packet is lost again, as in FIG. 8C, the loss frequency is "2".

Figure 9A:
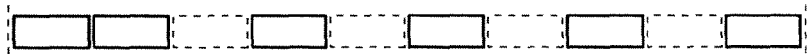
FIG. 9A is a view showing a packet loss state.
Figure 9B:
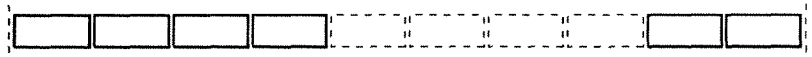
FIG. 9B is a view showing a packet loss state.
Figure 9C:
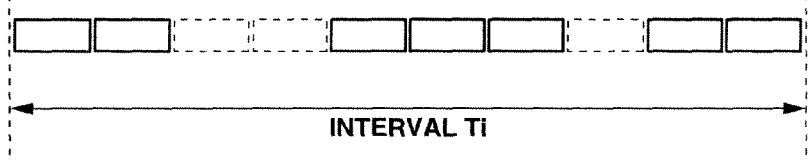
FIG. 9C is a view showing a packet loss state.

(b) Packet losses generated in a predetermined interval are counted as a packet loss of one time independently of the packet loss pattern, as shown in FIGS. 9A, 9B, and 9C. For example, when the predetermined interval is set as 10 IP packets (the sequence numbers are, for example, 30 to 39), the packet losses in FIG. 8A are counted as a packet loss of one time.

The predetermined interval can be given in the following way.

(a) A predetermined number of IP packets are defined as one interval (for example, 10 IP packets).

(b) A slice that constitutes one frame is defined as one interval (a plurality of slices may be defined as one interval).

(c) One frame is defined as one interval (a plurality of frames may be defined as one interval).

(d) One GoP is defined as one interval (a plurality of GoPs may be defined as one interval).

A slice, frame, or GoP may directly be read out from payload information concerning media. However, since payload information concerning media is often encrypted for copyright protection, a slice, frame, or GoP may be discriminated using a marker bit in an RTP header or a payload unit start indicator in a TS header, as described above.

The above-described intervals are merely examples, and the present invention also incorporates intervals determined by any other method.

The starting point of the "predetermined interval" may be a lost packet.

Note that the above-described intervals are given by a frame, GoP, second, or the like. Since the interval depends on the system or codec (encoder and decoder), it may be determined by subjective assessment (may be determined by any other method).

Note that when every other packet is lost, as shown in FIG. 9A (this also applies to FIGS. 9B and 9C), the quality estimation accuracy is expected to be improved by handling packet losses in the predetermined interval as one packet loss. More specifically, the quality when the continuous loss length is "1" and that when the continuous loss length is "10" are almost the same. For this reason, if, for example, 10 packets are defined as the predetermined interval, the loss frequency is preferably counted as "1" in the cases of FIGS. 9A, 9B, and 9C.

The encoding quality calculation unit 103 estimates video quality immediately after encoding from an encoding bit rate Br and frame information (not only a frame rate Fr but also an intra-refresh rate or a GoP is usable). Examples of video quality estimation by the encoding quality calculation unit 103 will be described below as the first and second embodiments.

First Embodiment

In the first embodiment, as shown in FIG. 1, an encoding quality calculation unit 103 receives video communication service type information A representing that the target video is, e.g., IPTV, VoD (Video on Demand), or videophone, video communication format information B representing that the target video is, e.g., HD (High Definition) or SD (Standard Definition), and codec information C representing, e.g., H.264 or MPEG4. The encoding quality calculation unit 103 then accesses, out of quality databases in the storage unit, a quality database 103A shown in FIG. 5A corresponding to the received service type information A, video format information B, and codec information C. The encoding quality calculation unit 103 derives, from the video quality values in the accessed quality database 103A, a quality value (a quality value represented by a quality characteristic X in FIG. 1) corresponding to an encoding bit rate and frame rate input from an IP packet analysis unit 101. The encoding quality calculation unit 103 transfers the quality value to a video quality estimation unit 104. However, the pieces of input information are not limited to the service type information A, video format information B, and codec information C. Any other information may be input to derive the quality value. The pieces of input information are not limited to the information extracted from the IP packet. The information may be input as external information like the service type information A.

Second Embodiment

In the second embodiment, an encoding quality calculation unit 103 mathematically expresses a quality characteristic. As parameter values v1 to v7 (to be described later) in the expressions, parameter values corresponding to input service type information A, video format information B, and codec information C are obtained from a coefficient database 103B shown in FIG. 5B. The obtained parameter values are input to the expressions, thereby deriving a video quality value as Vc to be described later. The video quality value Vc is transferred to a video quality estimation unit 104. The video quality value can mathematically be expressed by equations (1). However, the video quality value can sometimes be mathematically expressed by simpler equations. Hence, the present invention is not limited to those equations.

An example in which video quality estimation is done using expressions will be described below. A video quality estimation function of ITU-T Recommendation G.1070 or the like is applicable to the encoding quality calculation unit 103. An example of a G.1070 model is as follows.

[Mathematical 1]

$$V_C = 1 + I_{coding}$$

$$I_{coding} = I_{Ofr} \exp\left\{-\frac{[\ln(Fr) - \ln(Ofr)]^2}{2 \cdot DFr^2}\right\}$$

$$Ofr = v1 + v2 \cdot Br$$

$$I_{Ofr} = v3 - \frac{v3}{1 + \left[\frac{Br}{v4}\right]^{v5}}$$

$$DFr = v6 + v7 \cdot Br$$

(1)

where Vc is the video quality value which takes values 1 to 5, $I_{coding}$ is the video quality characteristic which takes values 0 to 4, Ofr is the optimum frame rate (a frame rate that maximizes the video quality for each bit rate), and $I_{Ofr}$ is the video quality value at the optimum frame rate. Note that Br is the above-described encoding bit rate, Fr is the above-described frame rate, and v1, v2, ..., v7 are the parameter values stored in the above-described coefficient database 103B, which are coefficients determined by the service type information A, video format information B, and codec information C (encoder and decoder).

In a service such as an IPTV service, communication is sometimes done at a fixed frame rate of 30 fps. Since the frame rate is always 30 fps, the degree of influence of the frame rate on the video quality need not be assessed. In this case, the video quality is assessed using quality estimation functions given by

[Mathematical 2]

$$V_C = 1 + I_{coding}$$
$$I_{coding} = v3 - \frac{v3}{1 + \left[\frac{Br}{v4}\right]^{v5}}$$
(2)

When the frame rate is fixed, coefficient values in a coefficient database 103C shown in FIG. 5C are used as the coefficients v3, v4, and v5 in equations (2).

The video quality estimation unit 104 estimates a video quality value V from a packet loss frequency PLF from a packet loss frequency calculation unit 102 and the video quality value Vc immediately after encoding from the encoding quality calculation unit 103. Examples of video quality estimation by the video quality estimation unit 104 will be described below as the third and fourth embodiments.

Third Embodiment

In the third embodiment, as shown in FIG. 1, a video quality estimation unit 104 receives target video service type information A, target video format information B, and codec information C representing, e.g., H.264 or MPEG4. The video quality estimation unit 104 then accesses, out of quality databases in the storage unit, a quality database 104A shown in FIG. 6A corresponding to the received service type information A, video format information B, and codec information C. The video quality estimation unit 104 derives, from the video quality values in the accessed quality database 104A, a video quality value (a video quality value represented by a quality characteristic Y in FIG. 1) corresponding to the video quality value received from an encoding quality calculation unit 103 and the packet loss frequency received from a packet loss frequency calculation unit 102. However, the pieces of input information are not limited to the service type information A, video format information B, and codec information C. Any other information may be input to derive the quality value. The pieces of input information are not limited to the information extracted from the IP packet. The information may be input as external information like the service type information A.

Fourth Embodiment

In the fourth embodiment, a video quality estimation unit 104 mathematically expresses a quality characteristic. As a parameter value v8 (to be described later) in the expression, a parameter value corresponding to input service type information A, video format information B, and codec information C is obtained from parameter values in a coefficient database 104B shown in FIG. 6B. The obtained parameter value is input to the expression, thereby deriving a video quality value as V. The video quality value can mathematically be expressed by equation (3). However, the video quality value can sometimes be mathematically expressed by a simpler equation. Hence, the present invention is not limited to this equation.

An example in which video quality estimation is done using an expression will be described below. The video quality estimation expression is given by

[Mathematical 3]

$$V = 1 + I_{coding} \cdot \exp\left[-\frac{PLF}{v8}\right]$$
(3)

where V is the video quality value which takes values 1 to 5, and v8 is a parameter value stored in the above-described coefficient database 104B, which is a coefficient determined by the service type information A, video format information B, and codec information C (encoder and decoder).

As described above, the video quality value of a video communication service can be estimated using parameters associated with the video quality. This allows a user who uses the service to easily determine whether predetermined quality or more is maintained. It is therefore possible to design quality parameters to be used in the video communication service or grasp and manage the quality condition of the service that is being provided.

Fifth Embodiment

Figure 2:
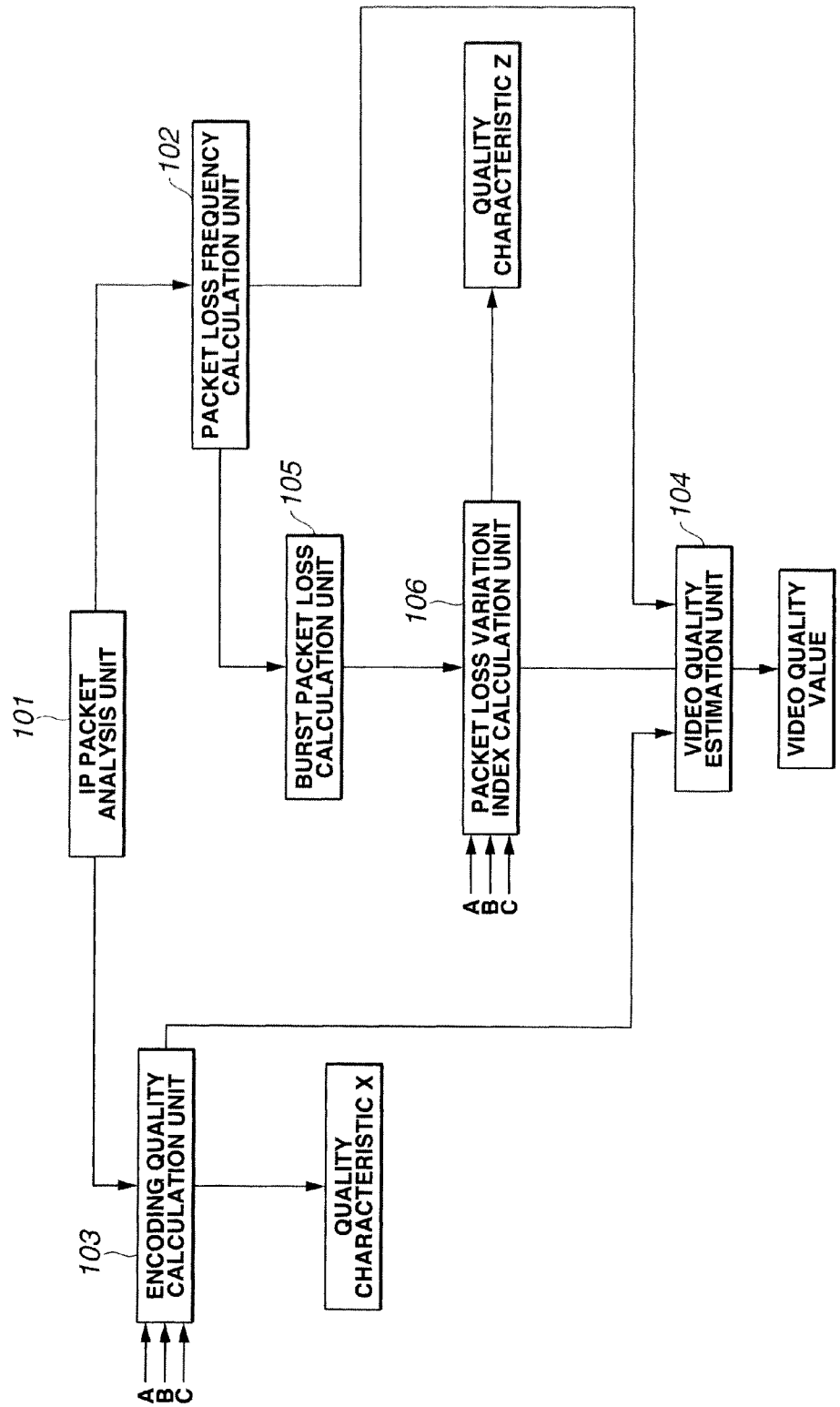
FIG. 2 is a block diagram showing a video quality estimation apparatus according to the fifth embodiment of the present invention.

FIG. 2 is a block diagram showing a video quality estimation apparatus according to the fifth embodiment of the present invention. The video quality estimation apparatus implements the functions of units such as an IP packet analysis unit 101, packet loss frequency calculation unit 102, encoding quality calculation unit 103, video quality estimation unit 104, burst packet loss length calculation unit 105, and packet loss variation index calculation unit 106 shown in FIGS. 1 and 2 by causing a computer such as a CPU to read out a program stored in a storage medium and execute the program. The video quality estimation apparatus also includes a storage unit which holds quality databases 103A and 104A and coefficient databases 103B, 103C, 104B, and 105B.

In the above-described fourth embodiment, an example has been explained in which the parameter value v8 is estimated as a fixed value corresponding to the service type information A, video format information B, and codec information C. At a high bit rate as in HDTV, one frame is formed from a number of packets (for example, one frame is formed from several ten to several hundred packets). For this reason, as the burst packet loss length (representing the number of continuously lost packets in a packet loss of one time) is about several ten, losses occur only in one frame at a high probability, and the video quality can be estimated by the packet loss frequency.

However, when encoding is done at a low bit rate as in mobile communication, the number of packets included in one frame is small (for example, one frame is formed from one packet). If a burst packet loss (for example, the burst packet loss length is 10) occurs, a lot of frames are lost (for example, 10 frames are lost) at once. Hence, the video quality tends to be poorer than that for a shorter burst loss length.

Figure 10:
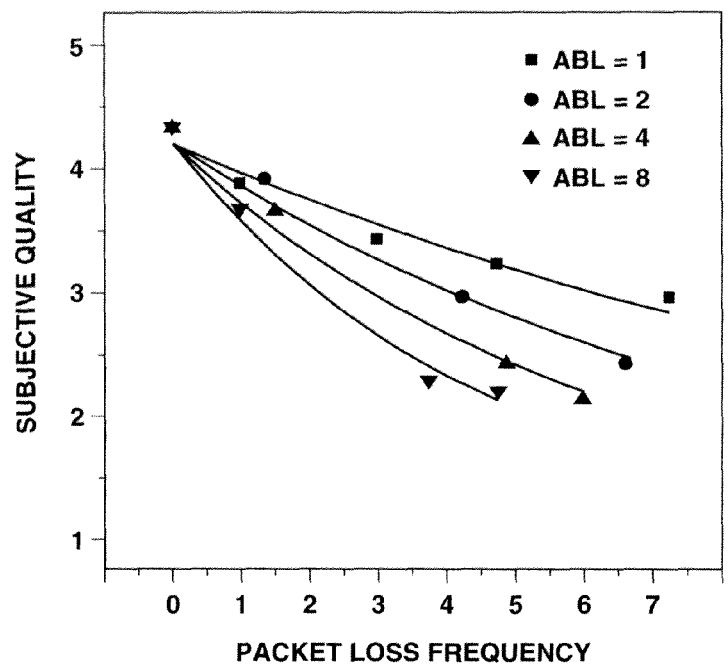
FIG. 10 is a graph showing the relationship between the subjective quality of packets and the packet loss frequency for each average burst packet loss length.

Subjective quality for an average burst packet loss length (ABL) monotonically decreases as the packet loss frequency increases, as shown in FIG. 10. The time constant of the exponential function changes for each above-described average burst packet loss length (ABL). The slope of the curve representing the exponential function becomes large as the average burst packet loss length increases, as shown in FIG. 10, in transmission at a low bit rate as in the above-described mobile communication. When the average burst packet loss length increases, the subjective quality abruptly lowers.

In the fifth embodiment, the video quality estimation unit 104 estimates a video quality value V based on a packet loss frequency PLF from the packet loss frequency calculation unit 102, a video quality value Vc immediately after encoding from the encoding quality calculation unit 103, and a packet loss variation index v8 from the packet loss variation index calculation unit 106.

In the fifth embodiment, the packet loss variation index v8 is mathematically expressed. Parameter values corresponding to input service type information A, video format information B, and codec information C are obtained from parameter values in the coefficient database 105B shown in FIG. 7. The obtained parameter values are input to the expression below, thereby deriving the packet loss variation index v8.

An example using an expression will be described below. The estimation expression is given by

[Mathematical 4]

$$v8 = a + b \cdot \exp(-BL/c) \quad (4)$$

where v8 is the packet loss variation index, and a, b, and c are the parameter values stored in the coefficient database 105B shown in FIG. 7, which are coefficients determined by the service type information A, video format information B, and codec information C. Note that ABL is the average burst packet loss length obtained by causing the burst packet loss length calculation unit 105 to average the burst packet loss lengths of packet losses calculated by the packet loss frequency calculation unit 102.

The thus obtained packet loss variation index v8, first video quality value Vc, and packet loss frequency PLF are input to equation (3), thereby obtaining the desired second video quality value V.

Figure 3:
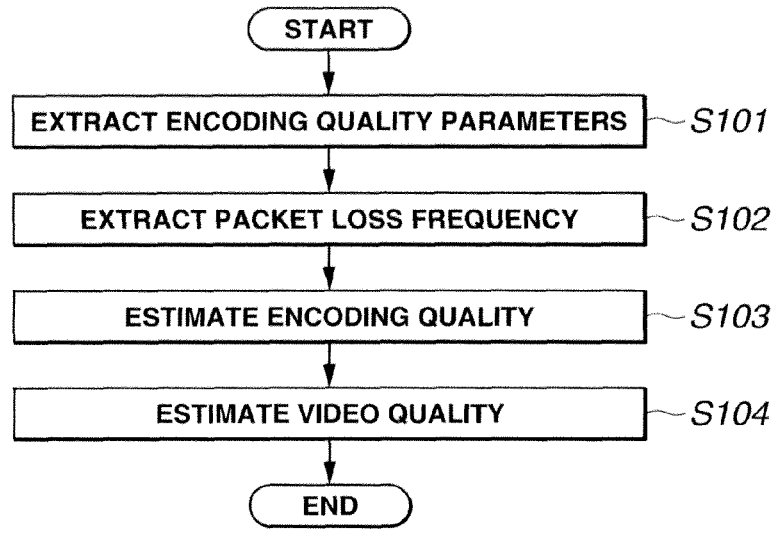
FIG. 3 is a flowchart illustrating an outline of the operations of the units of the video quality estimation apparatus shown in FIG. 1.

FIG. 3 is a flowchart illustrating an outline of the operations of the units of the video quality estimation apparatus according to the first to fourth embodiments of the present invention. The operation of the main part of the video quality estimation apparatus will be described with reference to the flowchart.

Upon receiving a captured IP packet, the IP packet analysis unit 101 extracts, from the received IP packet, quality parameters including an encoding bit rate, frame information such as a frame rate, and a packet loss pattern to be input to the packet loss frequency calculation unit 102 and the encoding quality calculation unit 103 as a video quality estimation function to estimate video quality. The extracted quality parameters are sent to the packet loss frequency calculation unit 102 and the encoding quality calculation unit 103 (step S101).

The packet loss frequency calculation unit 102 calculates the packet loss frequency from the packet loss pattern extracted by the IP packet analysis unit 101, and sends it to the video quality estimation unit 104 (step S102).

The encoding quality calculation unit 103 estimates video quality immediately after encoding from the encoding bit rate and frame information extracted by the IP packet analysis unit 101. In this case, the encoding quality calculation unit 103 accesses the quality database 103A corresponding to the received service type information A, video format information B, and codec information C. The encoding quality calculation unit 103 derives a video quality value (a video quality value represented by a quality characteristic X in FIG. 1) corresponding to the input encoding bit rate and frame rate, and transfers the video quality value to the video quality estimation unit 104. Alternatively, the encoding quality calculation unit 103 mathematically expresses the video quality characteristic as video quality estimation functions like equations (1) or (2) described above. The encoding quality calculation unit 103 inputs parameters to the equations to derive the video quality value Vc, and transfers it to the video quality estimation unit 104 (step S103).

The video quality estimation unit 104 estimates the video quality value V from the packet loss frequency calculated by the packet loss frequency calculation unit 102 and the video quality value Vc immediately after encoding from the encoding quality calculation unit 103. In this case, the video quality estimation unit 104 accesses the quality database 104A corresponding to the received service type information A, video format information B, and codec information C. The video quality estimation unit 104 derives a video quality value (a video quality value represented by a quality characteristic Y in FIG. 1) corresponding to the input video quality value Vc immediately after encoding and packet loss frequency. Alternatively, the video quality estimation unit 104 mathematically expresses the video quality characteristic as a video quality estimation function like equation (3) described above. The video quality estimation unit 104 inputs parameters to the equation to derive the video quality value V (step S104).

Figure 4:
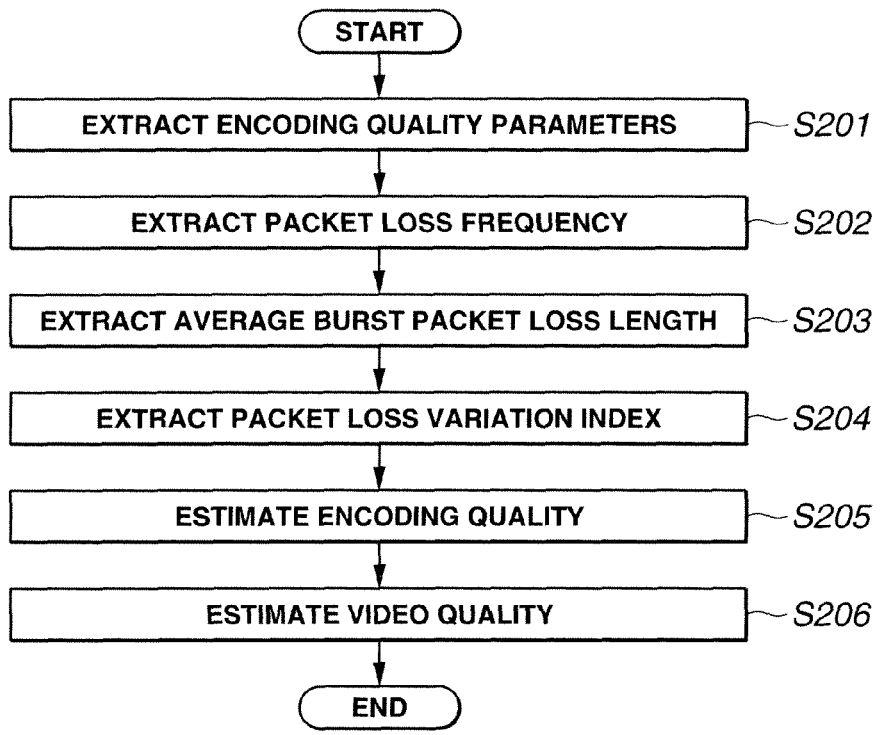
FIG. 4 is a flowchart illustrating an outline of the operations of the units of the video quality estimation apparatus shown in FIG. 2.

FIG. 4 is a flowchart illustrating an outline of the operations of the units of the video quality estimation apparatus according to the fifth embodiment of the present invention. The operation of the main part of the video quality estimation apparatus will be described with reference to the flowchart.

Upon receiving a captured IP packet, the IP packet analysis unit 101 extracts, from the received IP packet, quality parameters including an encoding bit rate, frame information such as a frame rate, and a packet loss pattern to be input to the packet loss frequency calculation unit 102 and the encoding quality calculation unit 103 as a video quality estimation function to estimate video quality. The extracted quality parameters are sent to the packet loss frequency calculation unit 102 and the encoding quality calculation unit 103 (step S201).

The packet loss frequency calculation unit 102 calculates the packet loss frequency from the packet loss pattern extracted by the IP packet analysis unit 101, and sends it to the video quality estimation unit 104 (step S202). The packet loss frequency calculation unit 102 also calculates a burst packet loss length corresponding to a packet loss of one time from the packet loss pattern extracted by the IP packet analysis unit 101, and sends it to the burst packet loss length calculation unit 105.

The burst packet loss length calculation unit 105 calculates the average burst packet loss length within the quality estimation interval from the burst packet loss length corresponding to a packet loss of one time calculated by the packet loss frequency calculation unit 102, and sends it to the packet loss variation index calculation unit 106 (step S203).

The packet loss variation index calculation unit 106 calculates a packet loss variation index corresponding to the average burst packet loss length calculated by the burst packet loss length calculation unit 105. In this case, the packet loss variation index calculation unit 106 mathematically expresses the quality characteristic corresponding to the received service type information A, video format information B, and codec information C as an estimation function like equation (4) described above. The packet loss variation index calculation unit 106 inputs parameters in the coefficient database 105B shown in FIG. 7 to equation (4) to derive the packet loss variation index (a quality characteristic coefficient value represented by a quality characteristic Z in FIG. 2), and sends it to the video quality estimation unit 104 (step S204).

Note that in this embodiment (fifth embodiment), after the burst packet loss length is measured a plurality of number of times, the average value of the lengths (average burst loss length) is obtained and used for variation index calculation. However, the value used for variation index calculation is not limited to the average burst loss length. For example, a value obtained by one measurement, a representative value obtained by a plurality of measurements, or a value obtained by statistical processing except the average value is also usable.

The encoding quality calculation unit 103 estimates video quality immediately after encoding from the encoding bit rate and frame information extracted by the IP packet analysis unit 101. In this case, the encoding quality calculation unit 103 accesses the quality database 103A corresponding to the received service type information A, video format information B, and codec information C. The encoding quality calculation unit 103 derives a quality value (a quality value represented by the quality characteristic X in FIG. 2) corresponding to the input encoding bit rate and frame rate, and transfers the quality value to the video quality estimation unit 104. Alternatively, the encoding quality calculation unit 103 mathematically expresses the quality characteristic as video quality estimation functions like equations (1) or (2) described above. The encoding quality calculation unit 103 inputs parameters to the equations to derive the video quality value Vc, and transfers it to the video quality estimation unit 104 (step S205).

The video quality estimation unit 104 estimates the video quality value V from the packet loss frequency calculated by the packet loss frequency calculation unit 102, the video quality value Vc immediately after encoding from the encoding quality calculation unit 103, and the packet loss variation index calculated by the packet loss variation index calculation unit 106 (step S206).

The invention claimed is:

1. A video quality estimation apparatus comprising:
    a packet analysis unit, executed by a computer processor, which extracts an encoding bit rate, a frame rate, and a packet loss pattern from an input IP packet as quality parameters;
    a packet loss frequency calculation unit which counts, from the extracted packet loss pattern, packet losses generated in a predetermined interval representing an interval of a plurality of continuous IP packets as a packet loss of one time, thereby calculating the count value as a packet loss frequency;
    an encoding quality calculation unit which calculates a first video quality value based on the extracted encoding bit rate and frame rate; and
    a video quality estimation unit which calculates a second video quality value based on the packet loss frequency calculated by said packet loss frequency calculation unit and the first video quality value calculated by said encoding quality calculation unit.

2. A video quality estimation apparatus according to claim 1, wherein said packet loss frequency calculation unit uses a lost packet as a starting point of the predetermined interval.

3. A video quality estimation apparatus according to claim 1, further comprising a first table in which a video quality value is set in correspondence with the encoding bit rate and the frame rate,
    wherein said encoding quality calculation unit accesses said first table to select the video quality value corresponding to the extracted encoding bit rate and frame rate, and calculates the selected video quality value as the first video quality value.

4. A video quality estimation apparatus according to claim 1, further comprising a second table in which a video quality value is set in correspondence with the first video quality value and the packet loss frequency,
    wherein said video quality estimation unit accesses said second table to select the video quality value corresponding to the first video quality value calculated by said encoding quality calculation unit and the packet loss frequency calculated by said packet loss frequency calculation unit, and calculates the selected video quality value as the second video quality value.

5. A video quality estimation apparatus according to claim 1, wherein
    said packet loss frequency calculation unit calculates a burst packet loss length representing the number of continuously lost packets from the extracted packet loss pattern, and
    said video quality estimation unit calculates the second video quality value based on the burst packet loss length and packet loss frequency calculated by said packet loss frequency calculation unit and the first video quality value calculated by said encoding quality calculation unit.

6. A video quality estimation apparatus according to claim 5, further comprising:
    a burst packet loss calculation unit which calculates, from the burst packet loss length, statistical information concerning the burst packet loss length within a quality estimation interval; and
    a packet loss variation index calculation unit which calculates a packet loss variation index corresponding to the statistical information concerning the burst packet loss length,
    wherein said video quality estimation unit calculates the second video quality value based on the packet loss variation index calculated by said packet loss variation index calculation unit, the packet loss frequency calculated by said packet loss frequency calculation unit, and the first video quality value calculated by said encoding quality calculation unit.

7. A video quality estimation apparatus according to claim 1, wherein
    said packet loss frequency calculation unit calculates a burst packet loss length representing the number of continuously lost packets from the extracted packet loss pattern, and
    the video quality monotonically decreases as the packet loss frequency increases.

8. A video quality estimation apparatus according to claim 1, wherein
    said packet loss frequency calculation unit calculates a burst packet loss length representing the number of continuously lost packets from the extracted packet loss pattern,
    the video quality has a characteristic which monotonically decreases as the packet loss frequency increases, and
    a degree of lowering a curve representing the monotonical decrease becomes large as the packet loss frequency increases.

9. A video quality estimation method comprising:
    the extraction step of extracting, by a computer system, an encoding bit rate, a frame rate, and a packet loss pattern from an input IP packet as quality parameters;
    the packet loss frequency calculation step of counting, from the extracted packet loss pattern, packet losses generated in a predetermined interval representing an interval of a plurality of continuous IP packets as a packet loss of one time, thereby calculating the count value as a packet loss frequency;
    the encoding quality calculation step of calculating a first video quality value based on the extracted encoding bit rate and frame rate; and
    the video quality estimation step of calculating a second video quality value based on the calculated packet loss frequency and the calculated first video quality value.

10. A video quality estimation method according to claim 9, wherein the packet loss frequency calculation step further comprises the step of using a lost packet as a starting point of the predetermined interval.

11. A video quality estimation method according to claim 9, wherein the encoding quality calculation step further comprises the step of accessing a first table in which a video quality value is set in correspondence with the encoding bit rate and the frame rate to select the video quality value corresponding to the extracted encoding bit rate and frame rate, and calculating the selected video quality value as the first video quality value.

12. A video quality estimation method according to claim 9, wherein the video quality estimation step further comprises the step of accessing a second table in which a video quality value is set in correspondence with the first video quality value and the packet loss frequency to select the video quality value corresponding to the first video quality value calculated in the encoding quality calculation step and the packet loss frequency calculated in the packet loss frequency calculation step, and calculating the selected video quality value as the second video quality value.

13. A video quality estimation method according to claim 9, wherein
in the packet loss frequency calculation step, a burst packet loss length representing the number of continuously lost packets is calculated from the extracted packet loss pattern, and
the video quality estimation step further comprises the step of calculating the second video quality value based on the burst packet loss length and packet loss frequency calculated in the packet loss frequency calculation step and the first video quality value calculated in the encoding quality calculation step.

14. A video quality estimation method according to claim 13, further comprising:
the burst packet loss calculation step of calculating, from the burst packet loss length, statistical information concerning the burst packet loss length within a quality estimation interval; and
the packet loss variation index calculation step of calculating a packet loss variation index corresponding to the statistical information concerning the burst packet loss length,
wherein the video quality estimation step comprises the step of calculating the second video quality value based on the packet loss variation index calculated in the packet loss variation index calculation step, the packet loss frequency calculated in the packet loss frequency calculation step, and the first video quality value calculated in the encoding quality calculation step.

15. A video quality estimation method according to claim 9, wherein
in the packet loss frequency calculation step, a burst packet loss length representing the number of continuously lost packets is calculated from the extracted packet loss pattern, and
the video quality monotonically decreases as the packet loss frequency increases.

16. A video quality estimation method according to claim 9, wherein
in the packet loss frequency calculation step, a burst packet loss length representing the number of continuously lost packets is calculated from the extracted packet loss pattern,
the video quality has a characteristic which monotonically decreases as the packet loss frequency increases, and
a degree of lowering a curve representing the monotonical decrease becomes large as the packet loss frequency increases.

17. A non-transitory computer-readable recording medium storing a program which causes a computer to execute:
extraction processing of extracting an encoding bit rate, a frame rate, and a packet loss pattern from an input IP packet as quality parameters;
packet loss frequency calculation processing of counting, from the extracted packet loss pattern, packet losses generated in a predetermined interval representing an interval of a plurality of continuous IP packets as a packet loss of one time, thereby calculating the count value as a packet loss frequency;
encoding quality calculation processing of calculating a first video quality value based on the extracted encoding bit rate and frame rate; and
video quality estimation processing of calculating a second video quality value based on the calculated packet loss frequency and the calculated first video quality value.

* * * * *